United States Patent [19]

Randolph

[11] Patent Number: 4,632,461

[45] Date of Patent: Dec. 30, 1986

[54] DUMP CART

[76] Inventor: Ralph A. Randolph, P.O. Box 36, Bushnell, Nebr. 69128

[21] Appl. No.: 775,788

[22] Filed: Sep. 13, 1985

[51] Int. Cl.[4] .............................................. B60P 1/04
[52] U.S. Cl. .................................... 298/2; 280/47.12; 298/5; 298/20 R; 414/438
[58] Field of Search ...................... 298/1 C, 2, 3, 5, 15, 298/19 R, 20 R; 414/434, 436, 437, 438, 442; 280/47.12, 47.31

[56] References Cited

U.S. PATENT DOCUMENTS

| | | | |
|---|---|---|---|
| 396,982 | 1/1889 | Cable | 298/2 X |
| 952,670 | 3/1910 | Fryman | 414/438 X |
| 1,549,471 | 8/1925 | Engler | 298/20 R |
| 1,804,403 | 5/1931 | Dowling | 280/47.12 X |
| 2,103,866 | 12/1937 | Norris | 298/5 X |
| 2,226,492 | 12/1940 | Helmig | 298/2 X |
| 2,358,864 | 9/1944 | Lockwood | 280/47.12 X |
| 2,533,549 | 12/1950 | Bell | 298/2 |
| 3,021,625 | 2/1962 | Stasse | 298/2 X |
| 3,189,387 | 6/1965 | Nieto | 298/20 R X |
| 4,023,693 | 5/1977 | Priefert | 414/438 X |
| 4,062,591 | 12/1977 | Harris et al. | 298/2 |

FOREIGN PATENT DOCUMENTS

| | | | |
|---|---|---|---|
| 99541 | 8/1964 | Denmark . | |
| 806328 | 12/1958 | United Kingdom | 414/436 |

Primary Examiner—Leslie J. Paperner
Attorney, Agent, or Firm—Dean P. Edmundson

[57] ABSTRACT

A wheeled dump cart is described which may be dumped from the user's normal position behind the handle. The cart includes a box member pivotably connected to the frame. A cam member may be pivoted from a normal raised position to a ground-engaging position. The cam member engages the box member and causes it to pivot forwardly relative to the frame so as to dump the contents of the cart.

7 Claims, 7 Drawing Figures

DUMP CART

FIELD OF THE INVENTION

This invention relates to wheeled carts having a box for the carrying of materials. More particularly, this invention relates to wheeled carts in which the box may be tilted relative to the frame of the cart for dumping purposes.

BACKGROUND OF THE INVENTION

Wheeled carts have long been used for the carrying or hauling of various materials. The carts are typically hand carts which are not propelled by any type of motor, although there has been previously proposed, for example, power driven wheelbarrows. U.S. Pat. Nos. 2,533,549 and 3,021,625.

Wheeled carts are used for a wide variety of purposes, such as for hauling dirt, sand, grass clippings, fertilizer, and various other materials around the yard. Typically these carts have two wheels and a box centered between the wheels. A handle is normally located on one end for the operator to use when pushing or pulling the cart from one location to another. The handle is typically firmly secured either to the box or to the frame, or both, so that in order to dump the contents out of the box it is necessary to lift the handle and tilt the entire cart to an inverted position (or at least sufficiently to cause the contents to spill out of the box). This is a cumbersome procedure and may be too physically demanding for some people. It may also be dangerous if not done with care.

Although there have been carts proposed in which the box may be tilted independently of the frame, such designs still require the operator or user to lift the box sufficiently to spill or pour the contents. See, for example, Danish Pat. No. 99,541.

U.S. Pat. No. 3,189,387 describes a trailer having a tilting bed. However, the design would not be satisfactory for a dump cart of the type described herein.

SUMMARY OF THE INVENTION

In accordance with the present invention there is provided a wheeled dump cart which is easy to use and simple to empty, utilizing a unique dumping action. The dump cart comprises:

(a) a frame member;
(b) at least two rotatable wheels supporting the frame;
(c) a box member carried by the frame and being pivotably connected to the frame;
(d) a handle member connected to the frame;
(e) a cam member pivotably connected to the frame which is adapted to pivot from a normally raised position downwardly to a ground-engaging position;
(f) actuating means operable from the handle for causing the cam member to pivot downwardly;
(g) engagement means, carried by the cam member, which is adapted to engage the box member and cause it to pivot forwardly relative to the frame as the cam member pivots downwardly.

Thus, there is no need to invert the entire cart in order to empty the contents. The dumping action is entirely controlled from the user's normal position behind the handle. Also, the contents of the cart are dumped forwardly of the wheels so it is not necessary to push or pull the cart over the contents after dumping. Other advantages will be apparent from the following description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
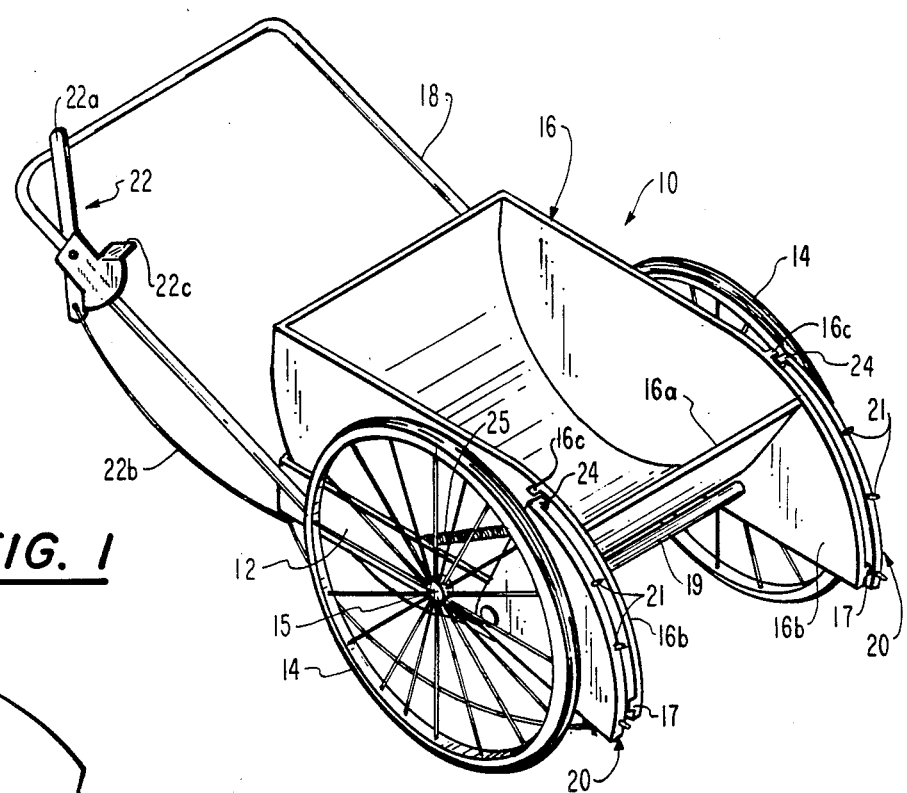
FIG. 1 is a perspective view of one embodiment of dump cart of the invention.

In FIG. 1 there is shown a perspective view of one embodiment of wheeled dump cart 10 of this invention. The cart includes frame member 12, rotatable wheels 14 supporting the frame, box member 16 carried by the frame, handle 18 connected to the frame, cam members 20 pivotably connected to the frame, actuating means 22 operable from the handle for causing the cam member to pivot downwardly, and engagement means 24 (carried by cam 20) which is adapted to engage the box 16 and cause it to pivot forwardly relative to the frame as the cam member pivots downwardly.

The box may be of any size convenient for normal yard and garden use. It may also be made of various materials, e.g., metal, wood, plastic, etc. or a combination of materials. Preferably the front wall 16a is sloped toward the front to facilitate dumping.

The frame member 12 is normally U-shaped and the lower portion of the box rests within the frame. If desired, the entire box may rest above the frame.

Preferably the pivot point for box 16 is located forwardly of the point where the wheels 14 are connected to the frame. In FIG. 1 the box pivots relative to the frame by means of shaft 19 which extends transversely of the frame and passes through the side wall members 16b of the box and the side members of the frame.

Cam member 20 are pivotably connected to the frame and are adapted to pivot from a normally raised position downwardly to a ground-engaging position. Cam member 20 includes finger 24 which engages detent 17 carried by the side of box 16. When the cam 20 is pivoted forwardly the teeth members 21 will engage the ground and cause the cam to continue rotating as the cart is moved forwardly. When finger 24 engages detent 17 of box 16, then the box is caused to raise and pivot forwardly so as to invert the box and cause the contents to be dumped forwardly of the cart.

The cam is initially caused to pivot forwardly by lever 22a being pushed forwardly against stop 22c so as to cause cable 22b to pull the cam 20 downwardly about its pivot point until teeth 21 engage the ground. The further forward movement of the cart causes further rotation of the cam, with consequent tipping and emptying of the box. After the contents of the box have been dumped, the cart is moved rearwardly by means of handle 18. Spring member 25, connected between the frame 12 and the cam 20, urges the cam 20 back to its normal raised position. Stop 16c on box 16 limits the rearward movement of cam member 20 when finger 24 on cam 20 reaches stop 16c.

Preferably there are two cam members 20, one on each side of the box 16. Each cam pivots on a common axis transverse to the side members of frame member 12.

Figure 2:
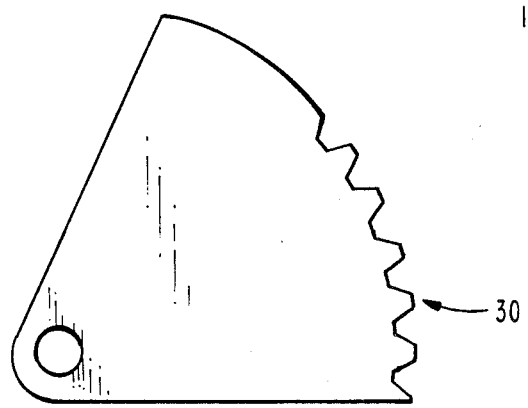
FIG. 2 is a side elevational view of an alternative embodiment of a cam member which is useful in the dump cart of this invention.

FIG. 2 illustrates an alternative embodiment of pie-shaped cam member 30. In this embodiment the teeth are similar in shape to gear teeth, as opposed to the spikes shown in the embodiment of FIG. 1. Preferably the teeth extend more than half the way along the curved outer edge of the cam.

In FIGS. 3-6 there are illustrated the various stages the cart of the invention goes through when the contents of the cart are being dumped. In these figures the wheel on the near side has been removed from axle 15 for the purpose of permitting full visual access of the other components of the cart.

The embodiment of the dump cart shown in FIGS. 3-6 is the same as that shown in FIG. 1 except that the cam 20 is shown with serrations 20a on its outer edge instead of spikes. FIGS. 3-6 also show a leg member 32 for supporting the rear portion of the frame member 12 when the cart is at rest.

Figure 3:
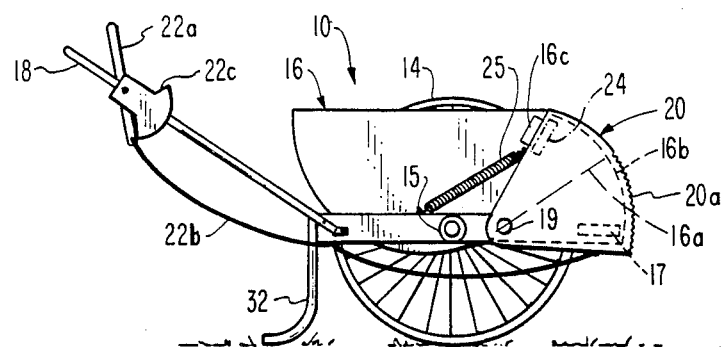
FIGS. 3–6 illustrate the dumping action of the cart of this invention.
Figure 4:
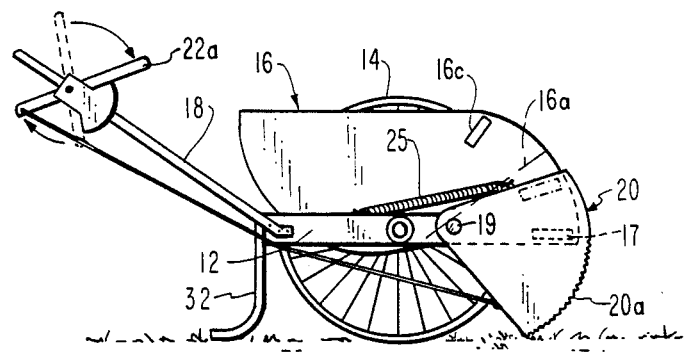

In FIG. 3 the cam 20 is in its normal raised position. In FIG. 4 lever 22a has been pushed forwardly until it contacts stop member 22c. Lever 22a is pivotably mounted to the handle. The lower end of lever 22a is connected to one end of cable 22b. The opposite end of cable 22b is attached to the lower edge of cam member 20 and accordingly causes cam 20 to pivot about point 19 downwardly so that the lower portion of cam 20 engages the ground. Preferably cam 20 projects slightly beyond the edge of the side wall 16b of box 16.

Figure 5:
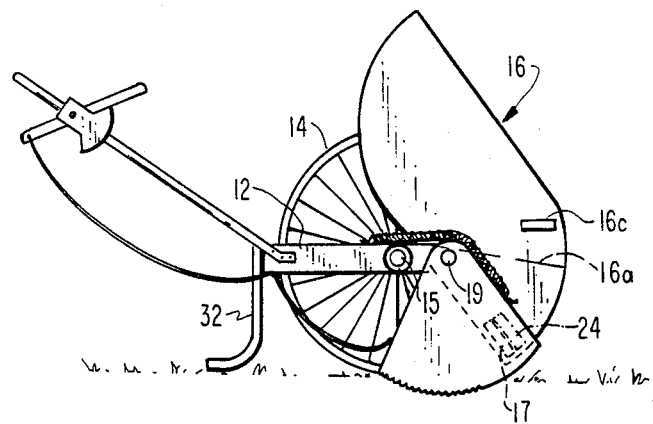
Figure 6:
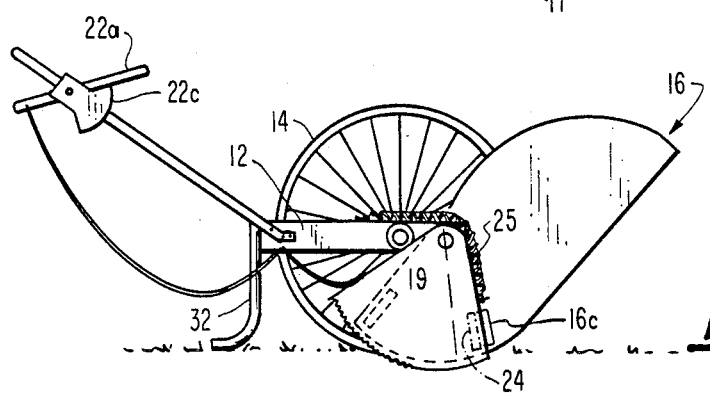

When the cart is urged forwardly the cam 20 remains firmly set against the ground and therefore rotates relative to frame 12. When finger 24 on cam 20 engages detent 17 on side wall 16b of the box 16, further forward movement of the cart causes box 16 to begin pivoting forwardly about point 19, as illustrated in FIG. 5.

Additional forward movement of the cart causes further rotation of the box 16 about point 19 to cause the contents of the box to be dumped forward of the cart. As the box tips forwardly, stop member 16c prevents the box from totally inverting since it contacts finger 24 on cam 20.

After the contents of the box have been dumped the cart is moved backward slightly, whereupon the spring 25 urges the cam 20 upwardly. Box 16 is accordingly urged back to its normal position supported by frame 12.

Figure 7:
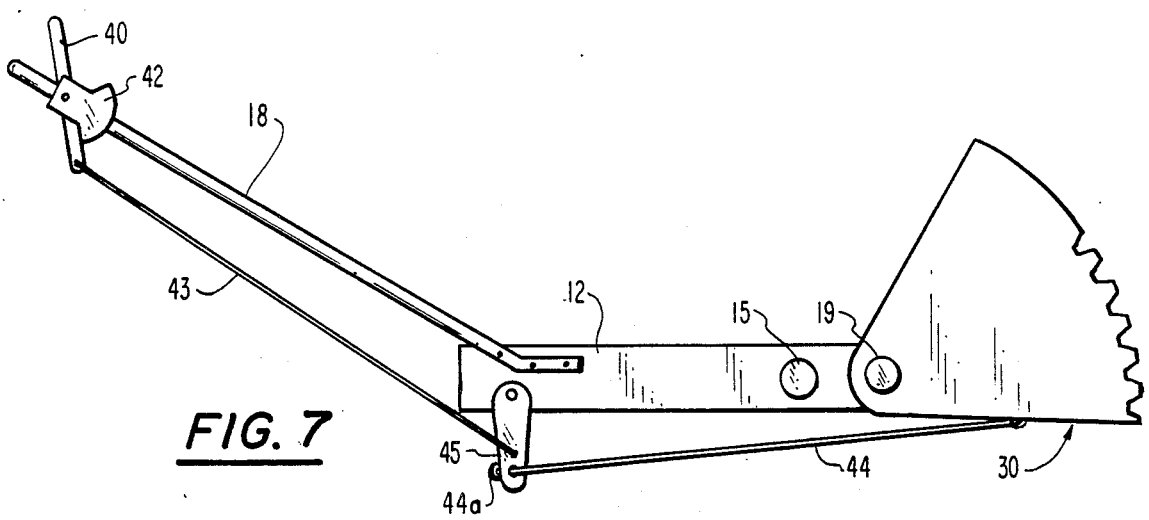
FIG. 7 shows an alternative form of actuating means useful in the cart of the invention.

In FIG. 7 there is illustrated another embodiment of actuating means which is useful in the present invention. In this embodiment lever 40 is pivotably carried on handle 18. The lower end of lever 40 is connected to rod member 43. The opposite end of rod 43 is connected to arm 45 which is pivotably carried by frame 12.

As the upper end of the lever 40 is urged forwardly against stop 42, the lower end of lever 40 urges rod member 43 rearwardly. This causes arm 45 to pivot rearwardly. One end of rod member 44 is connected to cam 30 while the opposite end of rod 44 passes through a slot in the lower part of arm 45. Oversized end 44a prevents rod 44 from being lost by the slot in arm 45, yet rod 44 may slide rearwardly through the slot as the cam 30 engages the ground and rotates relative to the frame 12 as the box is being emptied.

Other variants are possible without departing from the scope and spirit of the present invention. For example, there may be more than one leg 32 to support the rear portion of frame 12 while the cart is at rest. Also, a wheel may be included on the lower end of leg 32, if desired.

Other variants are also possible.

What is claimed is:

1. A wheeled dump cart comprising:
  (a) a U-shaped frame member;
  (b) two wheels supporting said frame, wherein one said wheel is rotatably mounted on each side of said frame;
  (c) a box member carried by said frame and being pivotably connected thereto; said box member including a detent on the outer edge thereof;
  (d) a handle member connected to said frame;
  (e) a pie-shaped cam member having an inner end and a curved outer edge, wherein said cam member is pivotably connected to said frame and is adapted to pivot from a normally raised position downwardly to a ground-engaging position;
  (f) actuating means operable from said handle member for causing said cam member to pivot downwardly;
  (g) engagement means comprising a finger, carried by said cam member, which is adapted to engage said detent on said box member and cause said box member to pivot forwardly relative to said frame as said cam member pivots downwardly.

2. A wheeled dump cart in accordance with claim 1, wherein said box member is pivotably connected to said frame at a point forwardly of said wheels, wherein said inner end of said cam member is pivotably connected to said frame at said point.

3. A wheeled dump cart in accordance with claim 2, wherein said frame member further includes a shaft extending transversely from one side of said frame to the other side thereof, wherein said box member and said inner end of said cam member are pivotably connected to said shaft.

4. A wheeled dump cart in accordance with claim 3, wherein said outer edge of said cam member includes teeth.

5. A wheeled dump cart in accordance with claim 3, wherein said actuating means comprises a lever and a cable, wherein said lever is pivotably carried by said handle, and wherein one end of said cable is connected to said cam member and the opposite end of said cable is connected to said lever.

6. A wheeled dump cart in accordance with claim 3, wherein said actuating means comprises a lever and a linkage comprising first and second rod members and an arm hinged to said frame, wherein said lever is pivotably carried by said handle, wherein one end of said first rod member is connected to said cam member and the opposite end of said first rod is carried by said arm, and wherein one end of said second rod is connected to said arm and the opposite end of said second rod is connected to said lever.

7. A wheeled dump cart in accordance with claim 3, further including spring means adapted to bias said cam member to a normally raised position.

* * * * *